(No Model.)
W. W. HALL.
CORN HARVESTER.
No. 444,157. Patented Jan. 6, 1891.
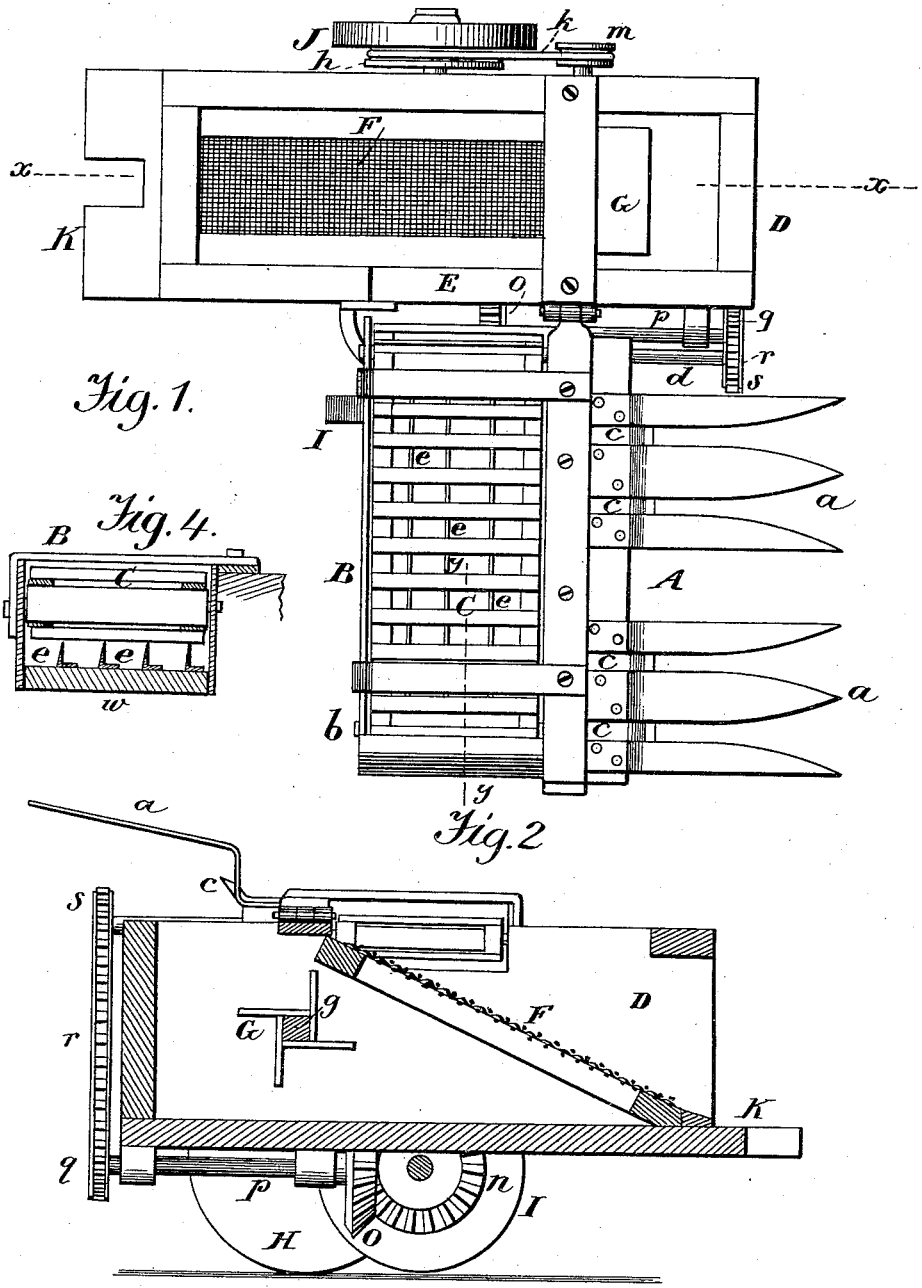
Witnesses.
A. Ruppert.
H. A. Daniels.
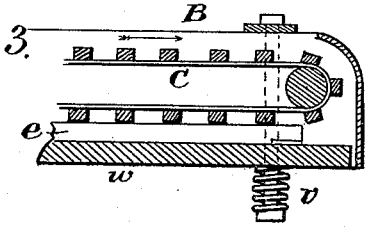
Inventor.
Wm. W. Hall
Per
Thomas P. Simpson
Atty

UNITED STATES PATENT OFFICE.

WILLIAM W. HALL, OF ELK CITY, KANSAS.

CORN-HARVESTER.

SPECIFICATION forming part of Letters Patent No. 444,157, dated January 6, 1891.

Application filed May 14, 1890. Serial No. 351,746. (No model.)

*To all whom it may concern:*

Be it known that I, WILLIAM W. HALL, a citizen of the United States, residing at Elk City, in the county of Montgomery and State of Kansas, have invented certain new and useful Improvements in Corn-Harvesters; and I do hereby declare the following to be a full, clear, and exact description of the invention, such as will enable others skilled in the art to which it appertains to make and use the same.

This invention relates to corn-harvesters; and it consists in certain improvements in the construction of such machines, as hereinafter described and claimed.

In the accompanying drawings, Figures 1 is a plan view of a corn-harvester provided with my improvements. Fig. 2 is a section taken on line $x\ x$ of Fig. 1. Fig. 3 is a section on line $y\ y$ of Fig. 1; Fig. 4, a cross-section through the trough, belt, and knives.

A designates a frame which carries the gathering devices, which are made fast to a bar at the front part of said frame and consist of the guards or gatherers $a$ and the intervening knives $c$. The guards $a$ are formed to rise somewhat from the points of attachment and extend forward, as shown. They are arranged in sets of three guards in a set, the middle one tapering to a point and the inner edges of the other two guards flaring somewhat, so that two stalks of corn will be caught between the three guards or gatherers as the machine is driven forward. The intervening knives $c$ are somewhat chisel-shaped and turned up somewhat at their forward ends to catch the ears of corn as the said knives move against the stalks.

At the rear of the gathering devices is a receiver B, into which the ears of corn fall after being cut from the stalks. On the rotative shafts $b$ and $d$, which extend through the receiver B, one being near each end thereof, are mounted two rollers, on which is placed a carrier or endless slatted apron C. A series of blades $e$ are fixed to the bottom of the receiver B, being placed longitudinally along the same and under the apron C. The purpose of these blades is to tear the husks from the corn as the ears are brought in contact with the blades by the moving apron.

D indicates a box, which is adjacent to and connected with the frame A in position to receive the corn and husks which pass thereto through the passage-opening E. An inclined plane F, formed chiefly of wire-cloth or open-work, is placed in the box D, the upper end being opposite the opening E and the lower end being at the rear end of the box, where the corn is discharged and a man stands with a sack to receive it.

G indicates a rotary fan, which is mounted on a shaft $g$ in the box D, said fan being in position to drive an air-blast rearward through the open-work inclined plane F, and thus blow the chaff from the corn when the latter has passed onto the inclined plane.

The box D is mounted on two wheels I and J, and the frame A extends at right angles from said box, being connected therewith, and has at its outer end a carrying-wheel H. A pulley $h$ is secured to the inner side of the wheel J and is connected by an endless band or cord $k$ with another pulley $m$ on the extended end of the fan-shaft $g$, motion being thus imparted from the driving-wheel J to the fan G. A bevel gear-wheel $n$ is formed on or secured to the inner side of the wheel I, said gear-wheel being in position to engage another bevel gear-wheel $o$ on one end of a shaft $p$, which is mounted in bearings carried by the box D. On the forward end of the shaft $p$ is a chain-wheel $q$, which is connected by an endless chain $r$ with a similar wheel $s$ on the extended end of the roller-shaft $d$, motion being imparted by these means to the endless apron C.

As the machine is driven forward, the stalks entering between the projecting gatherers $a$ are bent over as they come in contact with the fixed knives $c$, and the latter moving against the stalks cut the ears of corn therefrom. The ears falling on the moving apron in the receiver B are carried around in contact with the knives $e$ under the apron, where the husks are torn off by the knives and the contents of the receiver are discharged through the opening E to the inclined plane F. As the corn descends the inclined plane the fan G blows the chaff therefrom and the corn is caught in a sack by a man posted on a platform K at the rear end of the box D.

The bottom $w$ of the receiver B rests on several springs $v$, which allow the bottom to yield somewhat to the pressure of the gathered corn, which is brought around by the carrier C against the knives c.

I claim—

1. The combination, with the frame of a harvester, of a series of fixed gatherers a, cutting-knives c, a receiver located in rear of said gatherers, the bottom of said receiver being provided with springs, an endless apron C, provided with slats and mounted on rotative shafts which extend through said receiver, and a series of blades fixed longitudinally to the bottom of the said receiver, substantially as and for the purposes described.

2. The combination, with the frame of a corn-harvester, provided with a series of gathering devices a and fixed knives c, of a receiver placed at the rear of said gathering devices, a carrier C, mounted in said receiver, a box D, adjacent to said receiver, an inclined plane of open-work placed in said box in position to receive the gathered corn from the receiver, a rotative fan in position to drive an air-blast rearward through the said inclined plane, and mechanism for driving the carrier C and rotating said fan, substantially as set forth and described.

In testimony whereof I have affixed my signature in presence of two witnesses.

WILLIAM W. HALL.

Witnesses:
LOGAN AUTLE,
JNO. P. T. DAVIS.